US012763982B2

(12) United States Patent
Törnkvist et al.

(10) Patent No.: US 12,763,982 B2
(45) Date of Patent: Oct. 13, 2026

(54) MOBILE NETWORK OPERATOR AND MOBILE VIRTUAL NETWORK OPERATOR WITH COOPERATIVE CHARGING FUNCTIONS WHICH RECORD SERVICE RELATED INTENDED ACTIONS AND INDICATIONS OF SUCCESS

(71) Applicant: Telefonaktiebolaget LM Ericsson (publ), Stockholm (SE)

(72) Inventors: Robert Törnkvist, Karlskrona (SE); Annika Åhlberg, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 377 days.

(21) Appl. No.: 18/692,515

(22) PCT Filed: Sep. 15, 2021

(86) PCT No.: PCT/EP2021/075324
§ 371 (c)(1),
(2) Date: Mar. 15, 2024

(87) PCT Pub. No.: WO2023/041151
PCT Pub. Date: Mar. 23, 2023

(65) Prior Publication Data
US 2024/0396755 A1 Nov. 28, 2024

(51) Int. Cl.
*H04L 12/14* (2024.01)
*H04M 15/00* (2024.01)

(52) U.S. Cl.
CPC ........ *H04L 12/1407* (2013.01); *H04M 15/41* (2013.01)

(58) Field of Classification Search
CPC ..... H04M 15/41; H04W 4/24; H04L 12/1403; H04L 12/1407; H04L 12/14
See application file for complete search history.

(56) References Cited

U.S. PATENT DOCUMENTS 9,900,444 B1 * 2/2018 Seetharaman .... H04M 15/8044
2016/0105567 A1 * 4/2016 Dahl .................... H04M 15/41 455/406

(Continued)

OTHER PUBLICATIONS

International Search Report and Written Opinion of the International Searching Authority, PCT/EP2021/075324, mailed Jun. 9, 2022, 19 pages.

(Continued)

*Primary Examiner* — Margaret G Webb
(74) *Attorney, Agent, or Firm* — Sage Patent Group

(57) ABSTRACT

A first charging function (CHF) in a network node of a first communications network, receives a charging data request from a charging trigger function. The charging data request requests quota for a service provided by the network function. The first CHF determines that a second CHF of a second communications network needs to be contacted related to the service. The first CHF opens a charging data record (CDR) and adds charging data related to the service and an indication of intent to contact the second CHF to perform the recording related to the service and at least one of the account balance management related to the service and the rating related to the service. The first CHF sends the charging data request to the second CHF, and receives a charging data response indicating whether the second CHF completed the account balance management and/or the rating, and updates the CDR.

20 Claims, 3 Drawing Sheets

(56) References Cited

U.S. PATENT DOCUMENTS

| | | | | |
|---|---|---|---|---|
| 2016/0127565 | A1 | 5/2016 | Sharma et al. | |
| 2017/0374203 | A1* | 12/2017 | Sharma | H04M 15/41 |
| 2021/0122261 | A1* | 4/2021 | Qiao | B60L 53/665 |
| 2021/0234965 | A1 | 7/2021 | Kaki et al. | |
| 2022/0256040 | A1* | 8/2022 | Kahn | H04M 15/772 |
| 2022/0337706 | A1* | 10/2022 | Kotecha | H04M 15/8016 |
| 2024/0007314 | A1* | 1/2024 | Yao | H04L 12/1435 |
| 2024/0073802 | A1* | 2/2024 | Velev | H04W 48/18 |

OTHER PUBLICATIONS

3GPP TS 32.290 V16.3.0 (Dec. 2019); 3rd Generation Partnership Project; Technical Specification Group Services and System Aspects; Telecommunication management; Charging management; 5G system; Services, operations and procedures of charging using Service Based Interface (SBI) (Release 16), 34 pages.

3GPP TS 32.290 V17.2.0 (Jun. 2021); 3rd Generation Partnership Project; Technical Specification Group Services and System Aspects; Telecommunication management; Charging management; 5G system; Services, operations and procedures of charging using Service Based Interface (SBI) (Release 17), 38 pages.

3GPP TS 32.291 V16.8.1 (Jul. 2021); 3rd Generation Partnership Project; Technical Specification Group Services and System Aspects; Telecommunication management; Charging management; 5G system, charging service; Stage 3 (Release 16), 134 pages.

3GPP TS 32.298 V16.9.0 (Jun. 2021); 3rd Generation Partnership Project; Technical Specification Group Services and System Aspects; Telecommunication management; Charging management; Charging Data Record (CDR) parameter description (Release 16), 246 pages.

* cited by examiner

MOBILE NETWORK OPERATOR AND MOBILE VIRTUAL NETWORK OPERATOR WITH COOPERATIVE CHARGING FUNCTIONS WHICH RECORD SERVICE RELATED INTENDED ACTIONS AND INDICATIONS OF SUCCESS

CROSS REFERENCE TO RELATED APPLICATIONS

This application is a 35 U.S.C. § 371 national stage application of PCT International Application No. PCT/EP2021/075324 filed on Sep. 15, 2021, the disclosure and content of which is incorporated by reference herein in its entirety.

TECHNICAL FIELD

The present disclosure relates to mobile communications networks and recording network resource usage information related to communications through communication networks provided by mobile network operators.

BACKGROUND

The 3rd Generation Partnership Project (3GPP) through its standards organizations has specified a service based architecture in 3GPP TS 32.290 v16.3.0 where a network function (NF) may request charging from a charging function (CHF), and has specified in 3GPP TS 32.298 v16.9.0 the information elements to be added by a CHF to a Charging Data Record (CDR) for use by billing systems.

When a charging request is received by the CHF there are basically three functions the CHF can perform before responding to the request: rate management, balance management, and recording of the charging event. The rate and balance management are optional, but the recording of the charging event is mandatory. Because rate and balance management are optional, it becomes difficult or not possible for post processing systems to track all account balance management events, especially when more than one CHF is involved. For example, if CHF to CHF communication becomes an option for Mobile Virtual Network Operator (MVNO) use cases, i.e. where the Mobile Network Operator (MNO) CHF talks to a MVNO CHF, then it becomes even more difficult for post processing systems to track account balance management events.

SUMMARY

Some embodiments of the present disclosure are directed to a method by a first charging function (CHF) in a network node of a first communications network. The method includes receiving a charging data request from a charging trigger function of a network function, where the charging data request requests quota for a service provided by the network function. The method further includes determining that a second CHF of a second communications network needs to be contacted for recording related to the service and at least one of account balance management related to the service and rating related to the service. The method further includes opening a charging data record (CDR) and adding to the CDR charging data related to the service and an indication of intent of the first CHF to contact the second CHF to perform the recording related to the service and the at least one of the account balance management related to the service and the rating related to the service. The method further includes sending the charging data request to the second CHF. The method further includes receiving a charging data response from the second CHF indicating whether the second CHF completed the at least one of the account balance management related to the service and the rating related to the service, and updating the CDR to indicate whether the second CHF completed the at least one of the account balance management related to the service and the rating related to the service. The method further includes sending a charging data response to the network function with the quota.

Some other corresponding embodiments are directed to a method by a second CHF in a network node of a second communications network. The method includes receiving a charging data request from a first CHF of a first communications network, where the charging data request requesting quota for a service provided by a network function of the first communications network. The method further includes opening a CDR and adding to the CDR charging data related to the service and an indication of intent of the second CHF to perform at least one of account balance management related to the service and rating related to the service. The method further includes attempting to perform the at least one of the account balance management related to the service and the rating related to the service, and updating the CDR to add further charging data related to the service and an indication of whether the attempt to perform the at least one of the account balance management related to the service and the rating related to the service was successful. The method further includes sending a charging data response to the first CHF indicating whether the attempt to perform the at least one of the account balance management related to the service and the rating related to the service was completed successfully.

Some other corresponding embodiments are directed to a first CHF in a network node of a first communications network. The first CHF includes at least one processor and at least one memory coupled to the at least one processor and storing computer readable program code that when executed by the at least one processor causes the at least one processor to perform operations. The operations include to receive a charging data request from a charging trigger function of a network function, where the charging data request requesting quota for a service provided by the network function. The operations further include to determine that a second CHF of a second communications network needs to be contacted for recording related to the service and at least one of account balance management related to the service and rating related to the service. The operations further include to open a CDR and adding to the CDR charging data related to the service and an indication of intent of the first CHF to contact the second CHF to perform the recording related to the service and the at least one of the account balance management related to the service and the rating related to the service, and to send the charging data request to the second CHF. The operations further include to receive a charging data response from the second CHF indicating the second CHF completed the at least one of the account balance management related to the service and the rating related to the service, and to update the CDR to indicate whether the second CHF completed the at least one of the account balance management related to the service and the rating related to the service. The operations further include to send a charging data response to the network function with the quota.

Some other corresponding embodiments are directed to a second CHF in a network node of the second communications network. The second CHF includes at least one processor and at least one memory coupled to the at least one processor and storing computer readable program code that when executed by the at least one processor causes the at least one processor to perform operations. The operations include to receive a charging data request from a first CHF of a first communications network, where the charging data request requesting quota for a service provided by a network function of the first communications network. The operations further include to open a CDR and add to the CDR charging data related to the service and an indication of intent of the second CHF to perform at least one of account balance management related to the service and rating related to the service. The operations further include to attempt to perform the at least one of the account balance management related to the service and the rating related to the service, and to update the CDR to add further charging data related to the service and an indication of whether the attempt to perform the at least one of the account balance management related to the service and the rating related to the service was successful. The operations further include to send a charging data response to the first CHF indicating whether the attempt to perform the at least one of the account balance management related to the service and the rating related to the service was completed successfully.

Potential advantages that may be provided by one or more of the embodiments of the present disclosure can include that because the first CHF of the first communications network opens and adds to the CDR the indication of intent of the first CHF to contact the second CHF to perform the recording related to the service and the at least one of the account balance management related to the service and the rating related to the service, if the second CHF fails to respond with the charging data response for any reason, the first CHF and a post processing system (e.g., a billing system) of the first communications network will have notice of the request and possible failure of the second CHF to perform the requested recording related to the service, the account balance management related to the service, and/or the rating related to the service. Similarly, because the second CHF of the second communications network responds to receipt of the charging data request by opening and adding to the CDR the indication of intent of the second CHF to perform at least one of account balance management related to the service and rating related to the service, if the second CHF fails to complete the attempted performance and associated update of the CDR regarding success and/or failure of the attempted performance, the second CHF and a post processing system (e.g., a billing system) of the second communications network will have notice of the intended performance and whether the attempted performance was successful or failed. Communication of the charging data response from the second CHF to the first CHF indicating whether the second CHF completed the at least one of the account balance management related to the service and the rating related to the service, enables the first CHF to update the CDR to indicate whether the attempted performance was successful or failed, which again can be used by the first CHF and/or the post processing system.

It is noted that aspects described with respect to one embodiment may be incorporated in different embodiments although not specifically described relative thereto. That is, all embodiments and/or features of any embodiments can be combined in any way and/or combination. Moreover, other methods by CHFs and related CHFs according to embodiments will be or become apparent to one with skill in the art upon review of the following drawings and detailed description. It is intended that all such other methods by CHFs and related CHFs be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figure 1:
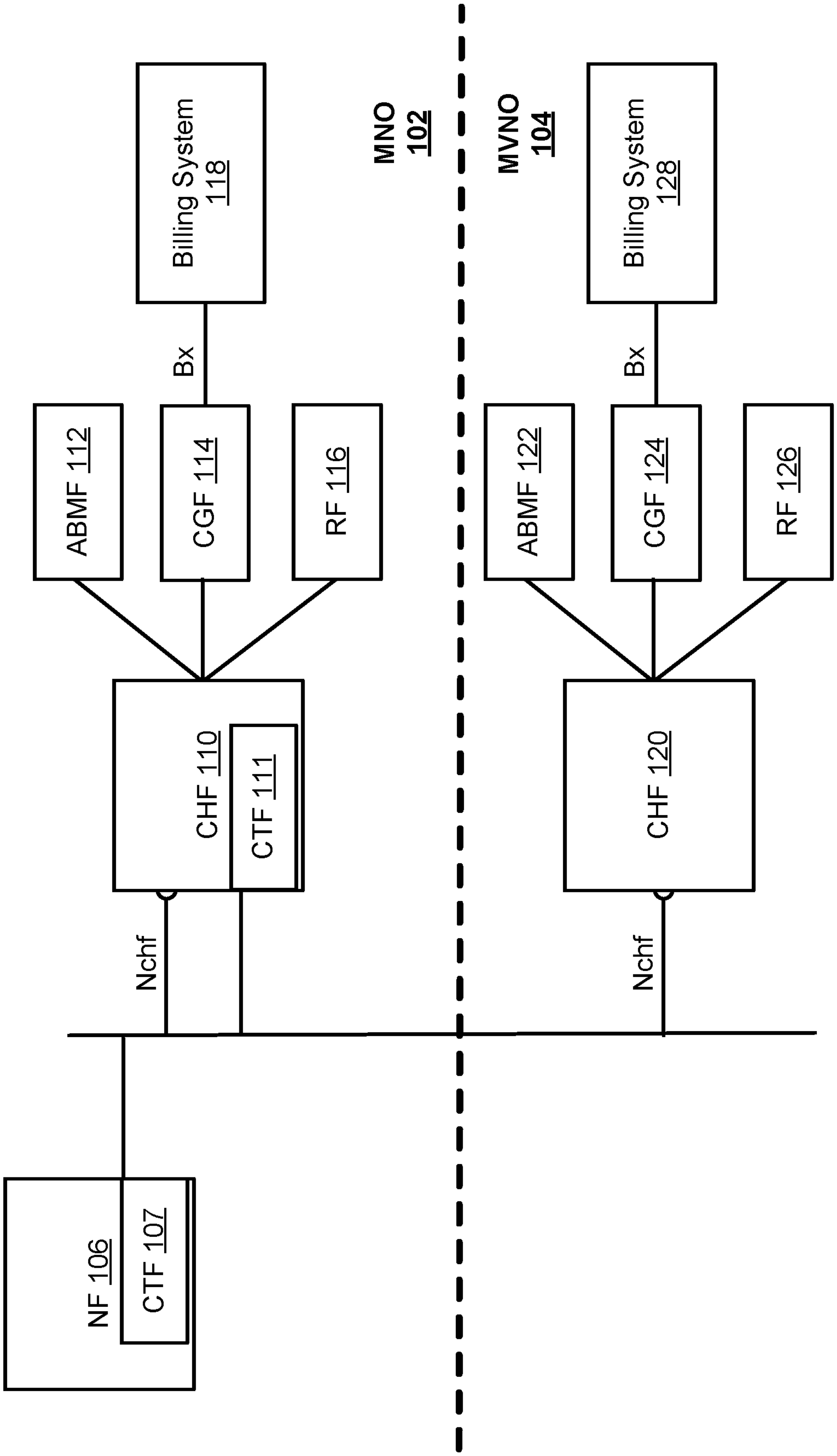
FIG. 1 illustrates a block diagram of a communications system that includes a CHF of a first mobile network operator (MNO) network which communicates with a charging function (CHF) of a mobile virtual network operator (MVNO) network in accordance with some embodiments of the present disclosure.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of various present inventive concepts to those skilled in the art. It should also be noted that these embodiments are not mutually exclusive. Components from one embodiment may be tacitly assumed to be present/used in another embodiment.

Some account management functions can be performed by knowing if the units have been rated or not, and therefrom inferring whether the account was updated due to the rating. However, this inference may not be correct when the charging function (CHF) has only updated the account, only rated, failed to update the account, or failed to rate the information. An account management function may not be able to determine if there is a record from the rating and account balance management, and not all events require both rating and account balance management. If there is just a counting of usage in the account there is no use of rating, and if the event is debited at the end of the month there might not be a need for an account balance but only rating.

This means that the post processing systems must attempt to find all related events from the account balance management and from the rating and merge these with the records generated from the CHF. After this has been done the post processing must then check all the records to determine if any are missing rating and/or account balance management. Moreover, it would be difficult for the post processing systems to determine if it has accessed all necessary information because if the balance was updated but the event is missing the systems would be not be made aware and able to track this.

When CHF to CHF communication becomes an option for the Mobile Virtual Network Operator (MVNO) use cases, i.e. the Mobile Network Operator (MNO) CHF talks to an MVNO CHF, then it becomes even more important to be able to signal and record actions were initiated and completed by which entity. In this case the rating and account balance management could be done in both places for different purposes. The MNO may use rating for granting a temporary quota or account balance management to keep track of how much units the MVNO has used and the MVNO needs to keep track of the consumers' usage. The MNO might in this case need to be able to prove that the event was successfully rated and that it confirmed that the account balance was updated by the MVNO.

Various embodiments of the present disclosure are directed to configuring CHFs to generate a new information element(s) that contains information about whether an event was processed by the account balance management function and/or the rating function. Alternatively or additionally, the new information element(s) may be configured to indicate whether processing for the account balance management function and/or the rating function was successful or not. The new information element(s) may be sent as part of an answer to a charging request and/or sent to post processing systems (e.g. billing system).

A potential benefit of these operations is that they enable the CHF and billing systems to know and record if an event was supposed to be processed by the account balance management and/or rating and, moreover, if the processing was successfully performed.

FIG. 1 illustrates a block diagram of a communications system that includes a CHF 110 of a first MNO 102 which communicates with a CHF 120 of a MVNO 104 in accordance with some embodiments of the present disclosure.

Referring to FIG. 1, the MNO 102 includes network functions (NFs) 106 which include a logical Charging Trigger Function (CTF) 107, a CHF 110 also containing a CTF 111, an Account Balance Management Function (ABMF) 112, a Charging Gateway Function (CGF) 114, a Rating Function (RF) 116, and a billing system 118. The MVNO 104 includes a CHF 120, an ABMF 122, a CGF 124, a RF 126, and a billing system 128.

The NFs 106 may be any functions in the 3GPP 5GC (5G core network architecture) context, although the NFs 106 would typically be a Session Management Function (SMF). The CTF 106 of the NFs 106 consumes the services from the CHFs 110 and 120 by consuming a Nchf service.

The CHF 110 of the MNO 102 operates as a NF service producer towards the NFs 106 in the MNO 102 network and provides the Nchf service. The CHF 110 of the MNO 102 also interacts with the ABMF 112 to update accounts, interacts with the RF 116 to rate a request from the NFs 106, and interacts with the CGF 114 for interaction with the billing system 118 or other post processing system. The billing system 118 generates account bills based on the information from the CHF 110, the AMBF 112, and the RF 116, as well as internal rating and account balance management functions.

The CHF 110 of the MNO 102 network further operates as a service consumer towards the CHF 120 of the MVNO 104 network, and hence contains the CTF 111. The CHF 120 of the MVNO 104 also interacts with the ABMF 122 to update accounts of the MVNO 104, interacts with the RF 126 to rate a request from the CHF 110 of the MNO 102 and/or the NFs 106, and interacts with the CGF 124 of the MVNO 104 for interaction with the billing system 128 or other post processing system. The billing system 128 generates account bills based on the information from the CHF 120, the AMBF 122, and the RF 126, as well as internal rating and account balance management functions.

Figure 2:
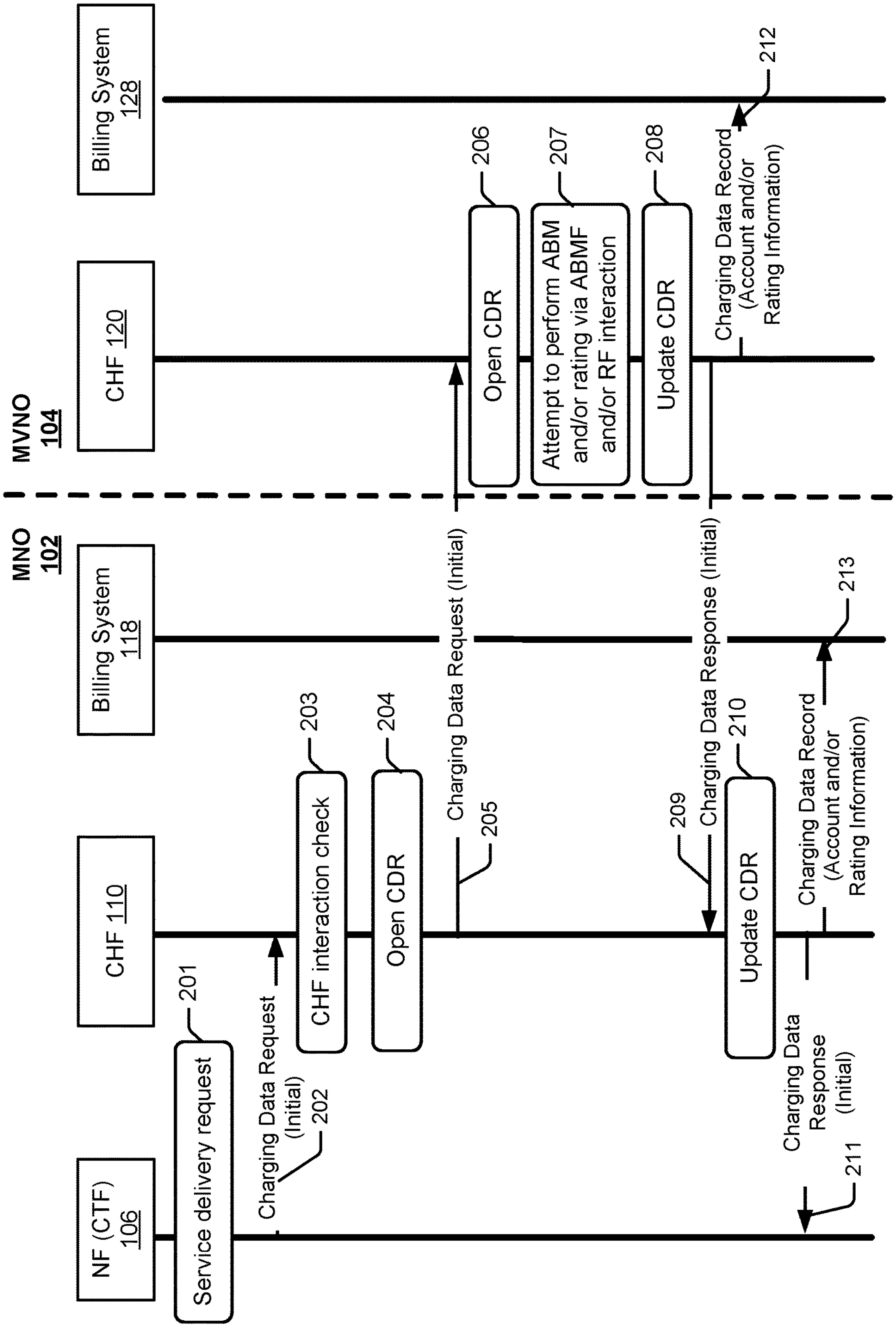
FIG. 2 illustrates a data flow diagram showing operations performed by a network function (NF), a CHF, and billing system of the MNO network of FIG. 1 and showing operations performed by a CHF and billing system of the MVNO network of FIG. 1 in accordance with some embodiments of the present disclosure.

FIG. 2 illustrates a data flow diagram showing operations performed by the NF 106, the CHF 110, and the billing system 118 of the MNO 102 network of FIG. 1 and showing operations performed by the CHF 120 and the billing system 128 of the MVNO 104 network of FIG. 1 in accordance with some embodiments of the present disclosure.

Referring to FIG. 2, the NF 106 provides 201 a service delivery request based on determining via the CTF 107 that a service is chargeable and may require quota monitoring. The NF 106 via the CTF 107 responsively sends 202 a charging data request (e.g., initial charging data request) to the CHF 110 of the MNO 102 network requesting quota for the service.

The CHF 110 of the MNO 102 network receives 202 the charging data request from the CTF 107 of the NF 106, where the charging data request requesting quota for a service provided by the NF 106. The CHF 110 determines 203 that another CHF 120 of the MVNO 104 network needs to be contacted for recording related to the service and at least one of account balance management related to the service and rating related to the service. In the example of FIG. 2, the CHF 110 of the MNO 102 network determines 203 based on charging data information and internal configuration whether the other CHF 120 of the MVNO 104 network needs to be contacted and determines 203 whether quota management is to be performed. As shown in FIG. 2, the CHF 110 determined 203 that it needs a quota management session (i.e. that recording, account balance management, and rating are required to be performed for the service) with the other CHF 120 of the MVNO 104 network.

The CHF 110 of the MNO 102 network opens 204 a charging data record (CDR) and adds to the CDR charging data related to the service and an indication of intent of the CHF 110 to contact the other CHF 120 of the MVNO 104 network to perform the recording related to the service and the at least one of the account balance management related to the service and the rating related to the service. In an example embodiment of FIG. 2, the CHF 110 adds to the CDR charging data related to the service and an indication of intent of the CHF 110 to contact the other CHF 120 of the MVNO 104 network to perform all three of: 1) recording related to the service; 2) the account balance management related to the service; and 3) the rating related to the service. Accordingly, the CHF 110 of the MNO 102 network may operate to add to the CDR the charging data related to the service and the indication of intent of the CHF 110 to contact the other CHF 120 of the MVNO 104 network to perform the recording related to the service and both of the account balance management related to the service and the rating related to the service.

The CHF 110 of the MNO 102 network sends 205 the charging data request to the other CHF 120 of the MVNO 104 network. In the example embodiment of FIG. 2, the CHF 110 operates like a NF service consumer to the other CHF 120 of the MVNO 104 network and sends 205 the charging data request to the other CHF 120 of the MVNO 104 network due to the trigger condition change, to report the used units for the service.

The CHF 120 of the MVNO 104 network receives 205 the charging data request from the CHF 110 of the MNO 102 network. The CHF 120 of the MVNO 104 network responsively opens 206 a CDR and adds to the CDR charging data related to the service and an indication of intent of the CHF 120 of the MVNO 104 network to perform at least one of account balance management related to the service and rating related to the service. In an example embodiment of FIG. 2, the CHF 120 of the MVNO 104 adds to the CDR an indication of intent of the CHF 120 of the MVNO 104 network to perform to perform all three of: 1) recording related to the service; 2) account balance management related to the service; and 3) rating related to the service.

The CHF 120 of the MVNO 104 network interacts with the ABMF 122 and RF 126 to attempt 207 to perform the at least one of the account balance management related to the service and the rating related to the service. In an example embodiment of FIG. 2, the CHF 120 of the MVNO 104 network interacts with the ABMF 122 and RF 126 to attempt 207 to perform both account balance management related to the service and rating related to the service.

The CHF 120 of the MVNO 104 network updates 208 the CDR to add further charging data related to the service and an indication of whether the attempt to perform the at least one of the account balance management related to the service and the rating related to the service was successful. In an example embodiment of FIG. 2, the CHF 120 updates 208 the CDR to indicate: 1) whether the opening of and recording in the CDR was successful; 2) whether the attempt to perform the account balance management related to the service was successful; and 3) whether the attempt to perform the rating related to the service was successful.

The CHF 120 of the MVNO 104 network sends 209 a charging data response to the CHF 110 of the MNO 102 network indicating whether the attempt 207 to perform the at least one of the account balance management related to the service and the rating related to the service was completed successfully. In a further embodiment, the charging data response is sent 209 to the CHF 110 responsive to determining that the CHF 120 successfully completed the at least one of the account balance management related to the service and the rating related to the service.

The CHF 110 of the MNO 102 network receives 209 the charging data response from the CHF 120 of the MVNO 104 network indicating whether the CHF 120 of the MVNO 104 network completed the at least one of the account balance management related to the service and the rating related to the service. In a further embodiment, the charging data response indicates whether the CHF 120 successful completed: the opening of and recording in the CDR; the account balance management related to the service; and the rating related to the service. The CHF 110 of the MNO 102 network updates 210 the CDR to indicate whether the CHF 120 of the MVNO 104 network completed the at least one of the account balance management related to the service and the rating related to the service (e.g., whether the CHF 120 successful completed: the opening of and recording in the CDR; the account balance management related to the service; and the rating related to the service). Accordingly, the CHF 110 of the MNO 102 network may update 210 the CDR to indicate whether the CHF 120 completed performance of the recording relating to the service and both the account balance management related to the service and the rating related to the service.

The CHF 110 of the MNO 102 network sends 211 a charging data response to the NF 106 with the quota.

The CHF 110 of the MNO 102 network can further update the CDR to indicate units of service that have been used during ongoing provision of the service by the NF 106 of the MNO 102 network. In a further embodiment, at some point in time the CHF 110 of the MNO 102 network closes and sends 213 the CDR to the CGF 114 of the MNO 102 network for interaction with the billing system 118 of the MNO 102 network. The CDR can include information about the service usage and indication of whether account balance management and/or rating was performed and whether such performance was successful or not.

The CHF 120 of the MVNO 104 network can further update the CDR to indicate units of service that have been used during ongoing provision of the service by the NF 106 of the MNO 102 network. At some point in time the CHF 120 of the MVNO 104 network closes and sends 212 the CDR to the CGF 124 of the MVNO 104 network for interaction with the billing system 128 of the MVNO 104 network. The CDR can include information about the service usage and indication of whether account balance management and/or rating at the MVNO 104 network was performed and whether such performance was successful or not.

Potential advantages that may be provided by one or more of the embodiments of the present disclosure can include that because the CHF 110 of the MNO 102 network opens and adds to the CDR the indication of intent of the CHF 110 to contact the CHF 120 of the MVNO 104 network to perform the recording related to the service and the at least one of the account balance management related to the service and the rating related to the service, if the CHF 120 of the MVNO 104 network fails to respond with the charging data response for any reason, the CHF 110 and a post processing system (e.g., the billing system 118) of the MNO 102 network will have notice of the request and possible failure of the CHF 120 of the MVNO 104 network to perform the requested recording related to the service, the account balance management related to the service, and/or the rating related to the service. Similarly, because the CHF 120 of the MVNO 104 network responds to receipt of the charging data request by opening and adding to the CDR the indication of intent of the CHF 120 of the MVNO 104 network to perform at least one of account balance management related to the service and rating related to the service, if the CHF 120 of the MVNO 104 network fails to complete the attempted performance and associated update of the CDR regarding success and/or failure of the attempted performance, the CHF 120 and a post processing system (e.g., the billing system 128) of the MVNO 104 network will have notice of the intended performance and whether the attempted performance was successful or failed. Communication of the charging data response from the CHF 120 of the MVNO 104 network to the CHF 110 of the MNO 102 network indicating whether the CHF 120 of the MVNO 104 network completed the at least one of the account balance management related to the service and the rating related to the service, enables the CHF 110 of the MNO 102 network to update the CDR to indicate whether the attempted performance was successful or failed, which again can be used by the CHF 110 of the MNO 102 network and/or the post processing system (e.g., the billing system 118).

Further embodiments of the present disclosure are directed to one or more information elements that can be added to the following Table 6.1.6.2.1.10-1 of 3GPP TS 32.291 v16.8.1 providing a Definition of type UsedUnitContainer:

| Attribute name | Data type | P | Cardinality | Description | Applicability |
|---|---|---|---|---|---|
| serviceId | ServiceId | $O_C$ | 0 . . . 1 | This field identity of the used service | |
| quotaManagementIndicator | QuotaManagementIndicator | $O_C$ | 0 . . . 1 | an indicator on whether the reported used units are with or without quota management control. If the attribute is not present, it indicates the used unit is without quota management applied. | |
| triggers | array (Trigger) | $O_C$ | 0 . . . N | This field specifies the reason for usage reporting for one or more types of unit associated to the rating group. | |
| triggerTimestamp | Date Time | $O_C$ | 0 . . . 1 | This field holds the timestamp when the reporting trigger occur. | |
| time | Uint32 | $O_C$ | 0 . . . 1 | This field holds the amount of used time. | |
| totalVolume | Uint64 | $O_C$ | 0 . . . 1 | This field holds the amount of used volume in both uplink and downlink directions. | |
| uplinkVolume | Uint64 | $O_C$ | 0 . . . 1 | This field holds the amount of used volume in uplink direction. | |
| downlinkVolume | Uint64 | $O_C$ | 0 . . . 1 | This field holds the amount of used volume in downlink direction. | |
| serviceSpecific Units | Uint64 | $O_C$ | 0 . . . 1 | This field holds the amount of used service specific units. | |
| eventTimeStamps | Array(DateTime) | $O_C$ | 0 . . . N | This field holds the timestamps of the event reported in the Service Specific Unit s, if the reported units are event based | |
| localSequence Number | integer | M | 1 | holds the Used Unit sequence number, i.e. the order when charging event occurs. It starts from 1 and increased by 1 for each Used Unit generation. | |
| accountAndRatingInfo | AccountAndRatingInfo | $O_C$ | 0 . . . 1 | Holds information about if rating and account balance management has been done or shall be done | Only applicable for CHF to CHF communication |

In the above Table 6.1.6.2.1 the information element "accountAndRatingInfo" has been added to a CDR with data type "AccountAndRatingInfo", which can store information as described above for operations 204 and 210, e.g., information indicating whether rating and account balance management was intended to be performed and whether rating and account balance management was successfully performed.

A new table, e.g., Table 6.x, referenced by the defined of type AccountAndRatingInfo, which includes the following new element fields:

| Attribute name | Data type | P | Cardinality | Description |
|---|---|---|---|---|
| accountBalanceMgmntRequired | boolean | $O_C$ | 0 . . . 1 | This field is set to true if account balance management is required, if its not included it is interpreted as false |
| ratingRequired | boolean | $O_C$ | 0 . . . 1 | This field is set to true if rating is required, if its not included it is interpreted as false |
| accountBalanceMgmntFailed | boolean | $O_C$ | 0 . . . 1 | This field is only included if accountBalanceMgmntRequired is set to true and it is set to true if account balance |

-continued

| Attribute name | Data type | P | Cardinality | Description |
|---|---|---|---|---|
| | | | | management failed, else if its not included it is interpreted as false |
| ratingFailed | boolean | $O_C$ | 0 . . . 1 | This field is only included if ratingRequired is set to true and it is set to true if rating failed, else if its not included it is interpreted as false |
| recordingRequired | boolean | $O_C$ | 0 . . . 1 | This field is set to true if recording is required, if its not included it is interpreted as false |
| recordingFailed | boolean | $O_C$ | 0 . . . 1 | This field is only included if recordingRequired is set to true and it is set to true if recording failed, else if its not included it is interpreted as false |

Corresponding operations by the CHF 110 of the MNO 102 network in accordance with some embodiments, when opening 204 (FIG. 2) and added to the CDR can include opening a CDR type of UsedUnitContainer including at least one of:

1) a field (accountBalanceMgmntRequired) indicating whether account balance management related to the service is required;
2) a field (ratingRequired) indicating whether rating related to the service is required; and
3) a field (recordingRequired) indicating whether recording related to the service is required.

Further operations by the CHF 110 of the MNO 102 network in accordance with some embodiments, to update 210 (FIG. 2) the CDR can include adding at least one of:

1) a field (accountBalanceMgmntFailed) indicating that the second CHF (120) failed to perform account balance management related to the service;
2) a field (ratingFailed) indicating that the second CHF (120) failed to perform rating related to the service; and
3) a field (recordingFailed) indicating that the second CHF (120) failed to perform recording related to the service.

Figure 3:
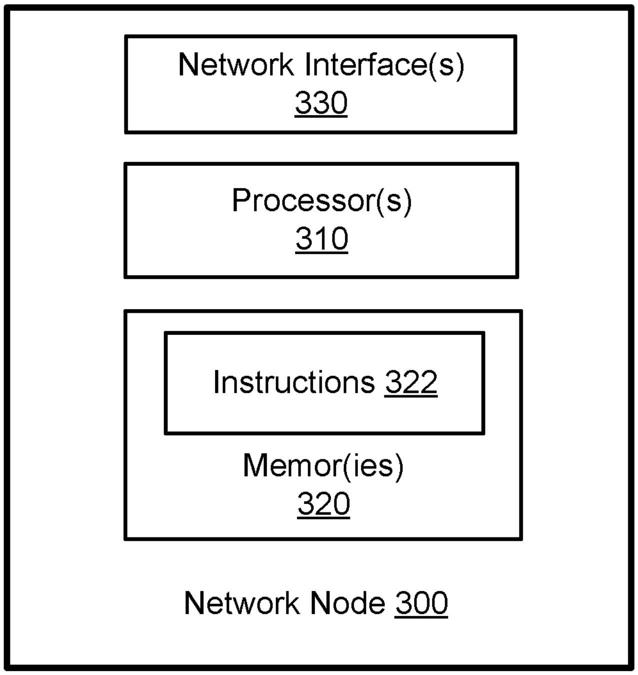
FIG. 3 is a block diagram of a network node containing components that are configured to implement either of the CHFs of FIGS. 1 and 2 in accordance with some embodiments of the present disclosure.

FIG. 3 is a block diagram of a network node 300 containing components that are configured to implement either of the CHFs 110 and 120 of FIGS. 1 and 2 in accordance with some embodiments of the present disclosure.

Referring to FIG. 3, the network node 300 includes one or more network interfaces 330 (referred to as "network interface" for brevity), one or more processors 310 (referred to as "processor" for brevity), and one or more memories 320 (referred to as "memory" for brevity) storing instructions 322. The network interface 330 may be configured to communicate through a wired interface, e.g., Ethernet, and/or wireless interface, e.g., wireless transceiver, according to one or more proprietary protocols and/or industry standardized protocols. The processor 310 may include one or more data processing circuits, such as a general purpose and/or special purpose processor (e.g., microprocessor and/or digital signal processor) that may be collocated or distributed across one or more networks. The processor 310 is configured to execute the instructions 322 in the memory 320, described below as a non-transitory computer readable medium, to perform some or all of the operations and methods that are described above for one or more of the embodiments of the CHFs 110 and/or 120, or other network components of the MNO 102 and/or the MVNO 104 disclosed herein.

Abbreviations Explanation

ABMF Account Balance Management Function
BSS Business Support Systems
CDR Charging Data Record
CGF Charging Gateway Function
Charging Function
CTF Charging Trigger Function
MNO Mobile Network Operator
CHF
MVNO Mobile Virtual Network Operator
NF Network Function
PGW Packet Gateway
RF Rating Function
SDN Software Defined Networking
SMF Session Management Function In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method by a first charging function, CHF, in a network node of a first communications network, the method comprising:

receiving a charging data request from a charging trigger function of a network function, the charging data request requesting quota for a service provided by the network function;

determining that a second CHF of a second communications network needs to be contacted for recording related to the service and at least one of account balance management related to the service and rating related to the service;

opening a charging data record, CDR, and adding to the CDR charging data related to the service and an indication of intent of the first CHF to contact the second CHF to perform the recording related to the service and the at least one of the account balance management related to the service and the rating related to the service;

sending the charging data request to the second CHF;

receiving a charging data response from the second CHF indicating whether the second CHF completed the at least one of the account balance management related to the service and the rating related to the service;

updating the CDR to indicate whether the second CHF completed the at least one of the account balance management related to the service and the rating related to the service; and sending a charging data response to the network function with the quota.

2. The method of claim 1, wherein:

the first communications network is a mobile network operator; and the second communications network is a mobile virtual network operator.

3. The method of claim 1, wherein the opening the CDR and adding to the CDR the charging data related to the service and the indication of intent of the first CHF to contact the second CHF to perform the recording related to the service and the at least one of the account balance management related to the service and the rating related to the service, comprises:

adding to the CDR the charging data related to the service and the indication of intent of the first CHF to contact the second CHF to perform the recording related to the service and both of the account balance management related to the service and the rating related to the service.

4. The method of claim 1, wherein the charging data response received from the second CHF indicates whether the second CHF completed performance of the recording relating to the service and both the account balance management related to the service and the rating related to the service.

5. The method of claim 4, wherein the CDR is updated to indicate whether the second CHF completed performance of the recording relating to the service and both the account balance management related to the service and the rating related to the service.

6. The method of claim 4, further comprising:

further updating the CDR to indicate units of service that have been used during ongoing provision of the service by the network function of the first communications network.

7. The method of claim 1, further comprising:

closing and sending the CDR to a charging gateway function for interaction with a billing system of the first communications network.

8. The method of claim 1, wherein the opening and adding to the CDR comprises opening a CDR type of UsedUnitContainer including at least one of:

a field (accountBalanceMgmntRequired) indicating whether account balance management related to the service is required;

a field (ratingRequired) indicating whether rating related to the service is required; and a field (recordingRequired) indicating whether recording related to the service is required.

9. The method of claim 8, wherein the updating the CDR comprises adding at least one of:

a field (accountBalanceMgmntFailed) indicating that the second CHF failed to perform account balance management related to the service;

a field (ratingFailed) indicating that the second CHF failed to perform rating related to the service; and a field (recordingFailed) indicating that the second CHF failed to perform recording related to the service.

10. A computer program product comprising:

a non-transitory computer readable medium storing instructions configured to be executed by at least one processor of a network node of a first communications network to cause the at least one processor to perform the method of claim 1.

11. A method by a second charging function, CHF, in a network node of a second communications network, the method comprising:

receiving a charging data request from a first CHF of a first communications network, the charging data request requesting quota for a service provided by a network function of the first communications network;

opening a charging data record, CDR, and adding to the CDR charging data related to the service and an indication of intent of the second CHF to perform at least one of account balance management related to the service and rating related to the service;

attempting to perform the at least one of the account balance management related to the service and the rating related to the service;

updating the CDR to add further charging data related to the service and an indication of whether the attempt to perform the at least one of the account balance management related to the service and the rating related to the service was successful; and sending a charging data response to the first CHF indicating whether the attempt to perform the at least one of the account balance management related to the service and the rating related to the service was completed successfully.

12. The method of claim 11, wherein:

the first communications network is a mobile network operator; and the second communications network is a mobile virtual network operator.

13. The method of claim 11, wherein the attempting to perform the at least one of the account balance management related to the service and the rating related to the service, comprises:

communicating with at least one of an account balance management function, ABMF, of the second communications network to attempt to perform the account balance management related to the service and a rating function, RF, of the second communications network to attempt to perform the rating related to the service.

14. The method of claim 11, wherein the sending of the charging data response to the first CHF is performed based on determining that the attempt to perform the recording relating to the service and both of the account balance management related to the service and the rating related to the service were completed successfully.

15. The method of claim 11, further comprising:

further updating the CDR to indicate units of service that have been used during ongoing provision of the service by the network function of the first communications network.

16. The method of claim 11, further comprising:

closing and sending the CDR to a charging gateway function for interaction with a billing system of the second communications network.

17. A first charging function, CHF, in a network node of a first communications network, the first CHF comprising:

at least one processor; and at least one memory coupled to the at least one processor and storing computer readable program code that when executed by the at least one processor causes the at least one processor to perform operations configured to:

receive a charging data request from a charging trigger function of a network function, the charging data request requesting quota for a service provided by the network function;

determine that a second CHF of a second communications network needs to be contacted for recording related to the service and at least one of account balance management related to the service and rating related to the service;

open a charging data record, CDR, and adding to the CDR charging data related to the service and an indication of intent of the first CHF to contact the second CHF to perform the recording related to the service and the at least one of the account balance management related to the service and the rating related to the service;

send the charging data request to the second CHF;

receive a charging data response from the second CHF indicating the second CHF completed the at least one of the account balance management related to the service and the rating related to the service;

update the CDR to indicate whether the second CHF completed the at least one of the account balance management related to the service and the rating related to the service; and send a charging data response to the network function with the quota.

18. The first CHF of claim 17, wherein:

the first communications network is a mobile network operator; and the second communications network is a mobile virtual network operator.

19. A second charging function, CHF, in a network node of a second communications network, the second CHF comprising:

at least one processor; and at least one memory coupled to the at least one processor and storing computer readable program code that when executed by the at least one processor causes the at least one processor to perform operations configured to:

receive a charging data request from a first CHF of a first communications network, the charging data request requesting quota for a service provided by a network function of the first communications network;

open a charging data record, CDR, and add to the CDR charging data related to the service and an indication of intent of the second CHF to perform at least one of account balance management related to the service and rating related to the service;

attempt to perform the at least one of the account balance management related to the service and the rating related to the service;

update the CDR to add further charging data related to the service and an indication of whether the attempt to perform the at least one of the account balance management related to the service and the rating related to the service was successful; and send a charging data response to the first CHF indicating whether the attempt to perform the at least one of the account balance management related to the service and the rating related to the service was completed successfully.

20. The second CHF of claim 19, wherein:

the first communications network is a mobile network operator; and the second communications network is a mobile virtual network operator.

* * * * *